US010394494B2

(12) United States Patent
Isaak et al.

(10) Patent No.: US 10,394,494 B2
(45) Date of Patent: Aug. 27, 2019

(54) METHOD FOR INPUTTING OF PRINT DATA FOR PRINTING UPON A PRINT OBJECT USING A PRINTER AND PRINTING SYSTEM WITH AT LEAST TWO PRINTERS

(71) Applicant: PHOENIX CONTACT GMBH & CO. KG, Blomberg (DE)

(72) Inventors: Peter Isaak, Detmold (DE); Albrecht Schierholz, Schieder-Schwalenberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/775,919

(22) PCT Filed: Nov. 11, 2016

(86) PCT No.: PCT/EP2016/077411
§ 371 (c)(1),
(2) Date: May 14, 2018

(87) PCT Pub. No.: WO2017/081237
PCT Pub. Date: May 18, 2017

(65) Prior Publication Data

US 2018/0321885 A1 Nov. 8, 2018

(30) Foreign Application Priority Data

Nov. 13, 2015 (DE) ........................ 10 2015 119 681

(51) Int. Cl.
*G06F 3/12* (2006.01)

(52) U.S. Cl.
CPC .......... *G06F 3/1204* (2013.01); *G06F 3/1206* (2013.01); *G06F 3/1255* (2013.01); *G06F 3/1258* (2013.01); *G06F 3/1261* (2013.01); *G06F 3/1291* (2013.01)

(58) Field of Classification Search
USPC ........................................................ 358/1.15
See application file for complete search history.

(56) References Cited

U.S. PATENT DOCUMENTS 7,102,778 B2 9/2006 Parry
8,514,436 B2 8/2013 Igarashi et al.
(Continued)

*Primary Examiner* — Ngon B Nguyen
(74) *Attorney, Agent, or Firm* — David S. Safran; Roberts Mlotkowski Safran Cole & Calderon, P.C.

(57) ABSTRACT

A method for inputting print data for printing on a print object with a printer, having the following steps: displaying a printer selection window on an input and display device and evaluating a performed selection of a printer, selecting a print-object selection window by means of a control and evaluation unit on the basis of the evaluated selection of the printer, displaying the selected print-object selection window having at least one print object that can be printed on by the selected printer, and evaluating a performed selection of the print object, selecting and displaying an input screen by means of the control and evaluation unit on the basis of the evaluated selection of the print object, transferring print data that are input into the input screen to the printing device of the printer or, by means of a data communication interface of the printer, to an external printer.

11 Claims, 6 Drawing Sheets

(56) References Cited

U.S. PATENT DOCUMENTS

| | | | | |
|---|---|---|---|---|
| 2003/0133146 | A1* | 7/2003 | Parry | G06F 3/1204 358/1.15 |
| 2010/0220162 | A1* | 9/2010 | Schierholz | B41J 3/407 347/102 |
| 2013/0248603 | A1* | 9/2013 | Schierholz | B41J 3/407 235/462.01 |
| 2014/0146453 | A1* | 5/2014 | Zhu | C22C 45/10 361/679.01 |
| 2014/0146493 | A1* | 5/2014 | Nagashima | B41J 29/02 361/752 |
| 2016/0257146 | A1* | 9/2016 | Akahane | B41J 29/02 |

* cited by examiner

METHOD FOR INPUTTING OF PRINT DATA FOR PRINTING UPON A PRINT OBJECT USING A PRINTER AND PRINTING SYSTEM WITH AT LEAST TWO PRINTERS

BACKGROUND OF THE INVENTION

Field of the Invention

The invention relates to a method for inputting print data for printing upon a print object using a printer, the printer having a housing with a print space made within the housing, a printing device, a receiving device for the print object to be printed upon, a control and evaluation unit, a memory, an input and display apparatus, and a data communications interface. In addition, the invention relates to a printing system with at least two printers for implementing the method.

Description of Related Art

In industrial and commercial practice, to identify and label machines, devices, terminals, cables or leads, different types of identification and marking labels are used on which information with respect to the components to which they are assigned is applied. For this purpose the identification or marking labels are conventionally provided with a corresponding print pattern, generally alphanumeric characters, in a printer. Different printers with different printing methods, for example inkjet printers, thermal transfer printers or UV printers, are used for marking. These marking printers are known for example from the catalog "Markierungssysteme Werkzeuge Montagematerial [Marking Systems, Tools, Assembly Material] 2013/2014", pages 28 to 37 of Phoenix Contact GmbH & Co. KG.

In practice print objects in card format which have a host of individual marking labels are often used. The print objects, which are also often called markers, are made in particular as plastic injection moldings or as plastic stamped parts. In plastic injection moldings which are also called Universal Card Material (UniCard or UC Material), the marking labels are attached via ties in an outer frame. After printing, the individual marking labels which are often used for marking of leads and cables or for terminal marking are parted from the frame.

In plastic stamped parts which are also called Universal Sheet Material (UniSheet or US Material) several rows of marking labels together form a marker, and after printing upon the US material the individual marking labels can be separated from one another.

Moreover, several identification or marking labels can also be applied, in particular can be cemented, onto a common carrier sheet, from which the individual identification or marking labels can be easily removed after marking. These carrier sheets are often also called lettering sheets or label sheets in practice. Moreover, there are also identification or marking labels in which roll material is used as the starting material. Here the individual identification or marking labels are often made as stickers which can be removed after printing upon the carrier material. Roll material can also be heat shrinkable sleeves in which the printed markers can then be separated at added perforations or cut to the desired length.

The different kinds of markers are generally called print objects in the following, the print objects consisting of different materials, in particular different plastics, and they can have different dimensions, in particular different material thicknesses.

In order to be able to print upon the different print objects, generally different types of printers are used. Printers with which print objects in card format can be printed upon are generally not suited to printing upon roll material. So that in printers for printing upon card material print objects with their different dimensions can be used and printed upon, the individual print objects for some printers are inserted into a magazine which fits the print object. Generally, several print objects can be inserted individually into a magazine so that the number of print objects is greater than the number of magazines. When all magazines have the same outside dimensions, any magazine can be inserted into the receiving device of the printer which can be moved in the manner of a drawer between a loading and unloading position outside the print space and a printing position within the print space.

Thermal transfer printers have turned out to be especially suitable for printing upon print objects which are used in the industrial domain. In thermal transfer printing a special film which is coated with a temperature-sensitive ink is guided through between the print object and a thermal printing head as a printing device, the film as an ink ribbon being located in a corresponding printer cassette. With thermal transfer printing an exact ink imprint and high print quality with high luster can be produced. But for this purpose it is necessary in any case for the print parameters, such as temperature, printing speed, material and thickness of the print object and of the ink ribbon to be matched to one another.

If the printer is made as a desktop printer, which is generally the case in thermal transfer printers known from practice, the print parameters and the print data which are used for the actual lettering of the print object are input using special software, the inputting taking place on external computers using graphic user interfaces. This type of input of print data is very convenient for the user, especially since the print parameters and print data are often already made available by corresponding software packages. The manual preparation of individual print data for certain print objects is also relatively convenient on external computers with conventional keyboards and corresponding large screens, in particular when using a corresponding graphic input software.

The print data are transmitted via the data communications interface of the printer from the computer to the printer, the computer likewise also having a corresponding data communications interface. The printer thus constitutes a peripheral device of the computer, the print parameters and print data being able to be input via the computer.

Here, the print data required at the time can also be transmitted to several different printers by means of a computer. This is indeed very convenient for the input of print data, but is associated with increased effort, in particular if the printers are to be used in the mobile domain.

In the mobile use of portable printers which are generally intended for printing upon roll material and are in part called handheld printers, the print parameters and the print data are input using the input and display apparatus which is provided on the printer and which has only relatively limited dimensions and often has only few function keys. Here too, the inputting of the print parameters and print data can be supported by corresponding software by corresponding menu items and selection filters being displayed or suggested to the user. The selection of the print parameters and the input of print data are however much less convenient here than is possible in input via a separate computer. Due to the small dimensions of the display apparatus real imaging of the desired format is generally not possible.

If nevertheless a printer is to be designed to be able to print upon a plurality of different print objects, the user must first select the print object to be printed upon via several filters or menu items before he can start with the input of print data into the input screen which is intended for the print object and which is often also called the printer form. The time spent in the selection of the input screen increases to the extent in which the number of the print objects which can be printed upon by the printer increases.

SUMMARY OF THE INVENTION

Therefore, the object of this invention is to develop the initially described method for the input of print data for printing upon a print object using a printer such that the input of print data can proceed even in mobile use with as little effort as possible, but conveniently for the user. Moreover, the object of the invention is to make available a printer system with at least two printers which is suitable for implementing the method.

This object is achieved in the method in accordance with the invention the method, first of all, having the following steps:

Display of a printer selection window on the input and display apparatus and evaluation of a completed selection of the printer with which a print object is to be printed upon, in the control and evaluation unit, Selection of a print object selection window from at least two print object selection windows which are stored in a memory by the control and evaluation unit using the evaluated choice of the printer, Display of the selected print object selection window on the input and display apparatus, the print object selection window displaying at least one print object which can be printed upon by the selected printer, and evaluation of a completed selection of the print object in the control and evaluation unit, Selection of an input screen from a plurality of input screens stored in the memory by the control and evaluation unit using the evaluated choice of the print object, Display of the selected input screen on the input and display apparatus, Transmission of the print data which have been input into the input screen to the printing device of the printer or via the data communications interface of the printer to an external second printer.

In the method in accordance with the invention, the print data for printing upon a print object are thus input via the input and display apparatus of a first printer, which apparatus is made accordingly for this purpose, the printing process then taking place either on the printer on which the print data have been input, or on a second external printer. The print data are transmitted to the second printer via the data communications interface of the first printer to a corresponding data communications interface of the second printer. In the method in accordance with the invention, the first printer no longer constitutes a printer which is “passive” with respect to the preparation of the print data, but a type of “master” printer via which the print data are input and transmitted to the second external printer. The second printer thus constitutes a type of “slave” printer relative to the first printer.

In the execution of the method in accordance with the invention, first the input and display apparatus of the “master” printer displays a printer selection window, and then in the control and evaluation unit the choice of the printer with which the print object is to be printed upon, which choice has been made by the user, is evaluated. Then the control and evaluation unit chooses from at least two print object selection windows stored in the memory of the “master” printer a print object selection window and displays it on the input and display apparatus. The print object selection window is chosen in doing so using the previously undertaken evaluation of the choice of the printer so that for the chosen printer a suitable print object selection window is displayed. The print object selection window generally displays several print objects which can be printed upon by the selected printer.

If the “master” printer is, for example, a printer for printing upon print objects in card format, in the print object selection window the different print objects, such as for example different UniCards or UniSheet materials, are displayed if the user has chosen this printer beforehand. If the second external printer is for example a printer for printing upon print objects in roll format, in the print object selection window the different roll materials which can be printed upon using this printer are displayed if the user has chosen the external printer beforehand.

Then, the control and evaluation unit, after evaluating a completed choice of the print object to be printed upon, chooses from a plurality of input screens stored in the memory the input screen which is intended for the selected print object and displays it on the input and display apparatus. The user can then start with the input of print data into the displayed input screen by means of the input and display apparatus. When the input of the print data is completed, the input print data are transmitted to the printing device of the “master” printer when a print object is to be printed upon with this printer. If a print object is to be printed upon using a second external printer, the print data are transmitted to the external printer via the data communications interface of the printer.

According to one advantageous configuration of the method in accordance with the invention, the input print data are transmitted to a selected external printer directly via a cable or wirelessly, i.e., without the print data being transmitted via an external server or the Internet. A wireless connection can proceed, for example, via wireless, in particular Bluetooth.

In the method in accordance with the invention, the print data can be input not only for the “master” printer and an external printer, but also for several external printers on the input and display apparatus of the “master” printer. Preferably, to do this after displaying of the (first) printer selection window, the display of another printer selection window takes place when the evaluation of the completed (first) selection of the printer has resulted in that the print object is to be printed upon with an external printer. Thus, via the first printer selection window, the choice is made of whether the printing is to take place with the “master” printer or with an external printer. In the second printer selection window, then, the choice of the specific external printer with which a print object is to be printed upon is made.

With the method in accordance with the invention, the print data can thus be input via the input and display apparatus of the “master” printer even if the printing process is to proceed on another external printer. In this way, it is possible to make the input of print data for the user clear and convenient even in portable printers which have no input and display apparatus or only a very small one. The print object which is to be printed upon is selected and the print data are input via the first printer, the “master” printer, so that the use of a computer for transmitting the print data to a second or several other printers can be omitted. The user can be supported in the selection of the print objects and the input of the print data via the control and evaluation unit of the "master" printer and corresponding software which has been installed on the "master" printer.

According to one especially preferred configuration of the method in accordance with the invention, when the evaluation of the completed selection of the printer has resulted in the print object to be printed upon with the "master" printer, the print object to be printed upon is automatically recognized. For this purpose, in the housing of the printer there is at least one optical sensor for detection of an identification which is located on the print object. In this way, the selection of the print object to be printed upon which is time-consuming under certain circumstances can be greatly simplified via the input and display apparatus which is provided on the printer.

According to the preferred configuration of the method, first the receiving device is retracted into the loading and unloading position outside the print space so that the print object to be printed upon can be inserted into the receiving device. Then, when the print object is being run into the print space, the identification located on the print object is detected by the optical sensor. The automatic recognition of the inserted print object is then used by the control and evaluation unit to select from the plurality of input screens which are stored in the memory the input screen which is intended for the inserted print object.

By using an optical sensor, in particular a reflex light scanner, an identification which is located on the print object and which corresponds to the code which has been assigned to the print object can be easily and economically detected. The identification is preferably a bar code identification consisting of several individual lines. Moreover, the identification can also be a pattern of holes, then the optical sensor being preferably a photoelectric barrier with which it can be ascertained whether a hole is made or not at a given position. If the extension of the identification is parallel to the direction in which the receiving device is moving, to detect the identification a single optical sensor which is located securely in the housing is sufficient, since then when the receiving device is being run into the print space the identification is moved past the optical sensor.

The object named at the beginning is achieved in a printer system with at least two printers, each of which have a housing with a print space which is made within the housing, a printing device, a receiving device for the print object which is to be printed upon, a control and evaluation unit, and a data communications interface. Moreover, at least the first printer additionally still has a memory and an input and display unit via which the printer and the print object to be printed upon are selected and the print data are input into a corresponding input screen.

In accordance with the invention, the control and evaluation unit of the first printer is made to evaluate a selection of the printer with which the print object is to be printed upon, which selection is undertaken in a printer selection window which is displayed on the input and display unit. Using the choice of the printer then a print object selection window is displayed on the input and display apparatus, the control and evaluation unit being made to evaluate the choice of a print object in the print object selection window and to select the input screen intended for the chosen print object from a plurality of input screens which are stored in the memory.

Nevertheless, the control and evaluation unit of the "master" printer is made to transmit the print data which have been input in the input screen displayed on the input and display unit to the second printer via the data communications interface when the initially completed evaluation of the printer choice has resulted in that the print object is to be printed upon with a second external printer. The control and evaluation unit of the first printer which acts as the "master" printer is thus able to activate a second printer which is connected to the first printer via the data communications interface and to transmit the print data which have been input on the input and display unit of the first printer [to] the second printer.

In the printer system in accordance with the invention, the configuration of the control and evaluation unit of the first printer thus enables the above described method in accordance with the invention to be executed and the activation and input of the print data to be undertaken also for a second external printer via the first printer. The use of an external computer for printer control and for input and transmission of the print data to the printer can thus be omitted.

According to one preferred configuration of the printer system in accordance with the invention, the input and display unit of the first printer is made as a touch-screen and preferably has a size (screen diagonal) of at least 7 inches. This makes it possible to display the input screen of a print object to be printed upon such that the input screen optically corresponds essentially to the print object. When print data are being input, the user then sees directly how the correspondingly printed print object appears later. Moreover, it is preferably provided that the input and display unit is fastened to the printer housing to be able to swivel or turn. This makes it more convenient for the user to operate, in particular to input the print data, since he can move the input and display unit into a position in which operation of the input and display unit is especially easily possible for him.

According to another especially preferred configuration of the printer in accordance with the invention, in the housing of the first printer there is at least one optical sensor for detecting an identification located on the print object. The control and evaluation unit of the printer is made to select the input screen which is suitable for the inserted print object using the identification of the inserted print object detected by the sensor from a plurality of input screens stored in the memory. The selected input screen is then displayed on the input and display apparatus of printer so that the user can then start directly with the input of the print data for the print object without under certain circumstances going through a plurality of menu items beforehand or choosing the desired print object from a plurality of possible print objects in a time-consuming manner. If in the printer system in accordance with the invention a print object is to be printed with the first printer, the automatic detection of the identification of the print object thus makes the input of the print data more convenient.

As has been stated above, the printer system in accordance with the invention has at least two printers, of which the first printer constitutes a type of "master" printer via which the second printer is activated and in particular is provided with the print data for printing upon the print object. Preferably, the two printers are made to print on different print objects so that the number of possible print objects to be printed upon is further increased.

Advantageously, the first printer of the printer system is designed to print upon print objects in card format. Since there are a host of different print objects in card format which can have different dimensions, the receiving device of the printer is made to accommodate an interchangeable magazine into which the print object which is to be printed upon at the time can be inserted. Generally, several print objects can be inserted individually into a magazine so that the number of print objects is clearly larger than the number of magazines. If all magazines have the same outside dimensions, any magazine can be inserted into the receiving device of the printer which can be moved in the manner of a drawer between a loading and unloading position outside the print space and a printing position within the print space.

In particular, when the first printer is designed to print upon print objects in card format, the second printer is intended preferably for printing upon print objects in roll format. The second printer can have only a small input and display apparatus or none at all; this is not disadvantageous in the printer system in accordance with the invention with respect to ease of operation since the print data can be input via the first printer. The second printer can therefore also be in particular a handheld printer.

In particular, at this point, there are a host of possibilities for configuring and developing the method in accordance with the invention as well as the printer in accordance with the invention as will be apparent from the following description of preferred exemplary embodiments in conjunction with the drawings.

DETAILED DESCRIPTION OF THE INVENTION

Figure 1:
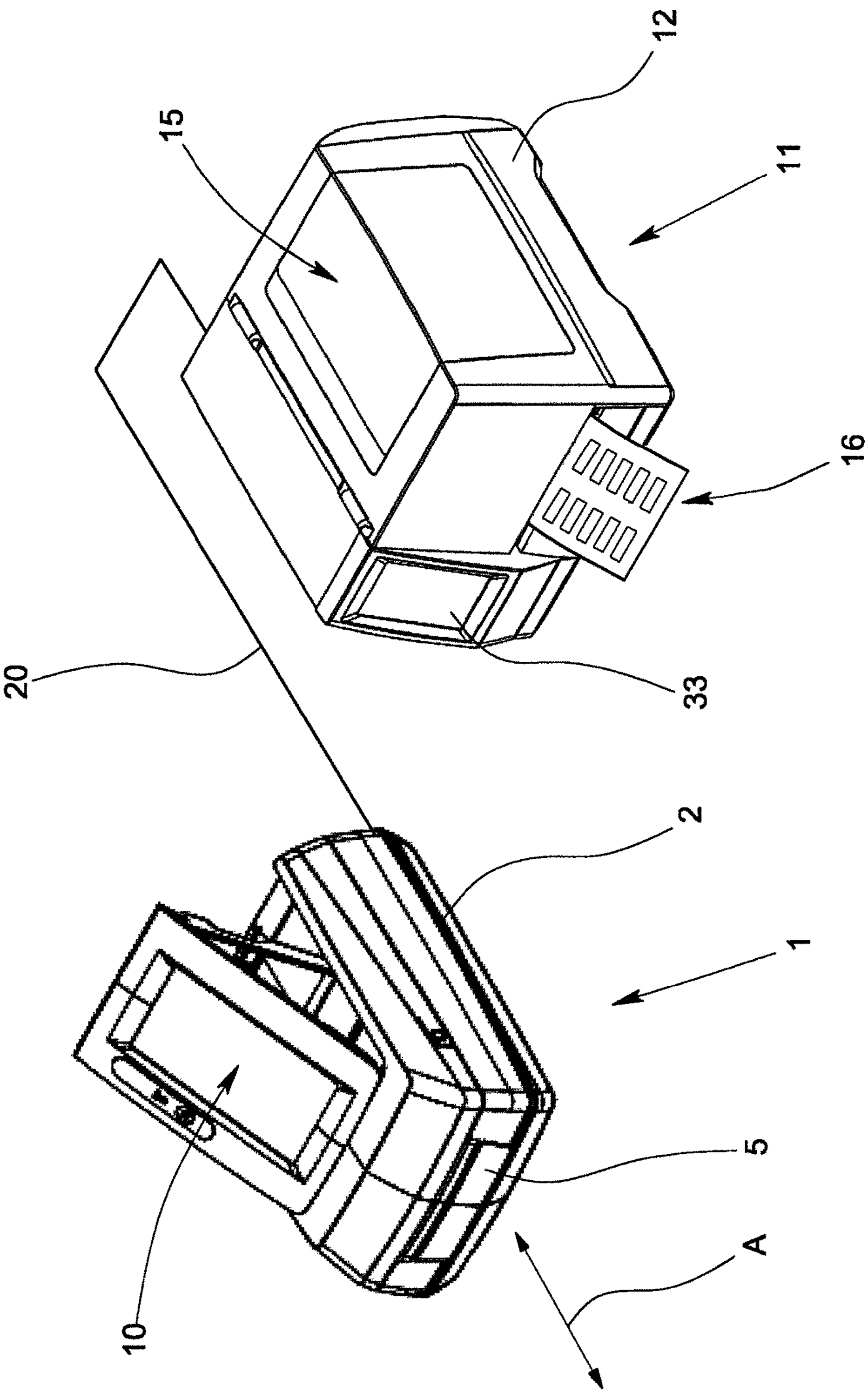
FIG. 1 shows an exemplary embodiment of a printer system with two printers.
Figure 2:
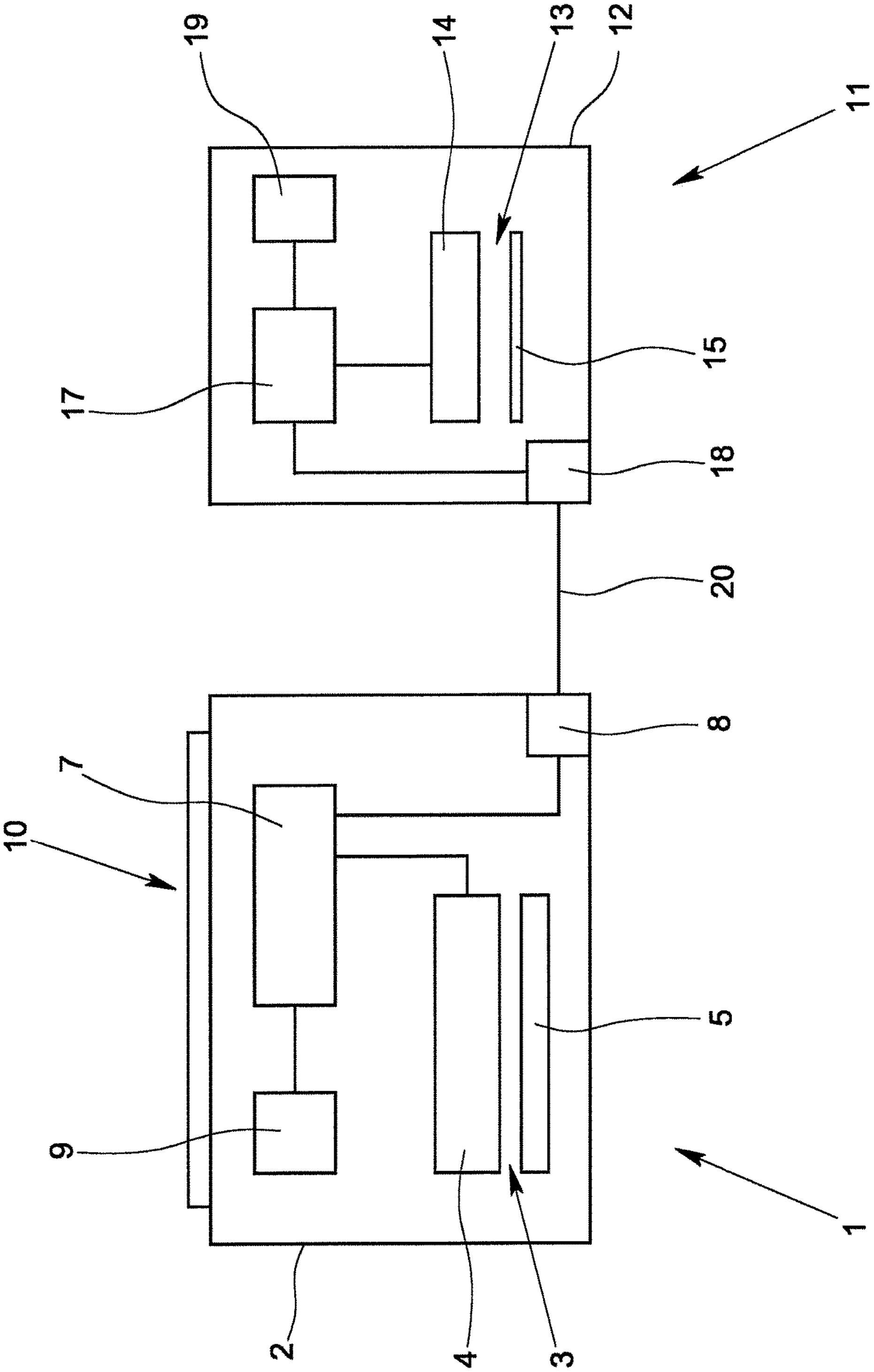
FIG. 2 shows a simplified block diagram of the two printers of the printer system.

FIGS. 1 and 2 show a printer system in accordance with this invention with a first printer 1 and a second printer 11 which both have a housing 2, 12 with a print space 3, 13 which is made within the housing 2, 12. As is apparent from the simplified block diagram according to FIG. 2, the two printers 1, 11 have a printing device 4, 14 and a receiving device 5, 15 for the print object 6, 16 which is to be printed upon (see, FIG. 6 relative to print object 6). In the illustrated exemplary embodiment, the two printers 1, 11 are thermal transfer printers so that the two printers 1, 11 as the printing device 4, 14 each have a thermal printing head. The first printer 1 is made for printing upon print objects 6 in card format, while the second printer 11 is designed for printing upon print objects 16 in roll format.

FIG. 2 also shows that the two printers 1, 11 have another control and evaluation unit 7, 17, a data communications interface 8, 18 and a memory 9, 19, the control and evaluation units 7, 17 being connected to the data communications interfaces 8, 18 and the memories 9, 19. Moreover, the two control and evaluation units 7, 17 are each also still connected to the pertinent printing device 4, 14 for its control. Moreover, the first printer 1 has another input and display unit 10 which is likewise connected to the control and evaluation unit 7.

The two printers 1, 11 are connected to one another via the data communications interface 8, 18 made for the two printers 1, 11 such that the second printer 11 can be controlled by the first printer 1, and in particular, the print data required for printing upon the print object 16 can be transmitted from the first printer 1 to the second printer 11. The first printer 1 thus acts as a type of "master" printer relative to the second printer 11 which accordingly constitutes a type of "slave" printer. In addition to the actual print data, the necessary print parameters can, moreover, also be transmitted to the second printer 11 from the first printer 1. Alternatively, or in addition, the print parameters or one part of the print parameters can also be stored in the memory 19 of the second printer 11 so that the print parameters which are required for printing are loaded from the memory 19 by the control and evaluation units 17 before printing upon the print objects 16. The connection 20 between the two printers 1, 11 and between the two data communications interfaces 8, 18 can be made via a cable or also wirelessly so that the connection 20 shown in FIG. 1 need not be a physical connection.

To select the print object 6, 16 which is to be printed upon and to input the print data the first printer 1 has an input and display unit 10 which is made as a touch-screen in the preferred exemplary embodiment. As can be recognized from FIG. 1, the input and display unit 10 is attached to the housing 2 of the first printer 1 with the capacity to swivel so that the input and display unit 10, as shown, can be moved into a swung-up position. The position of the input and display unit 10 can thus be adapted to different conditions of use, as a result of which the input of print data into the input and display unit 10 and the reading of different information off the input and display unit 10 are facilitated for the user.

Figure 3:
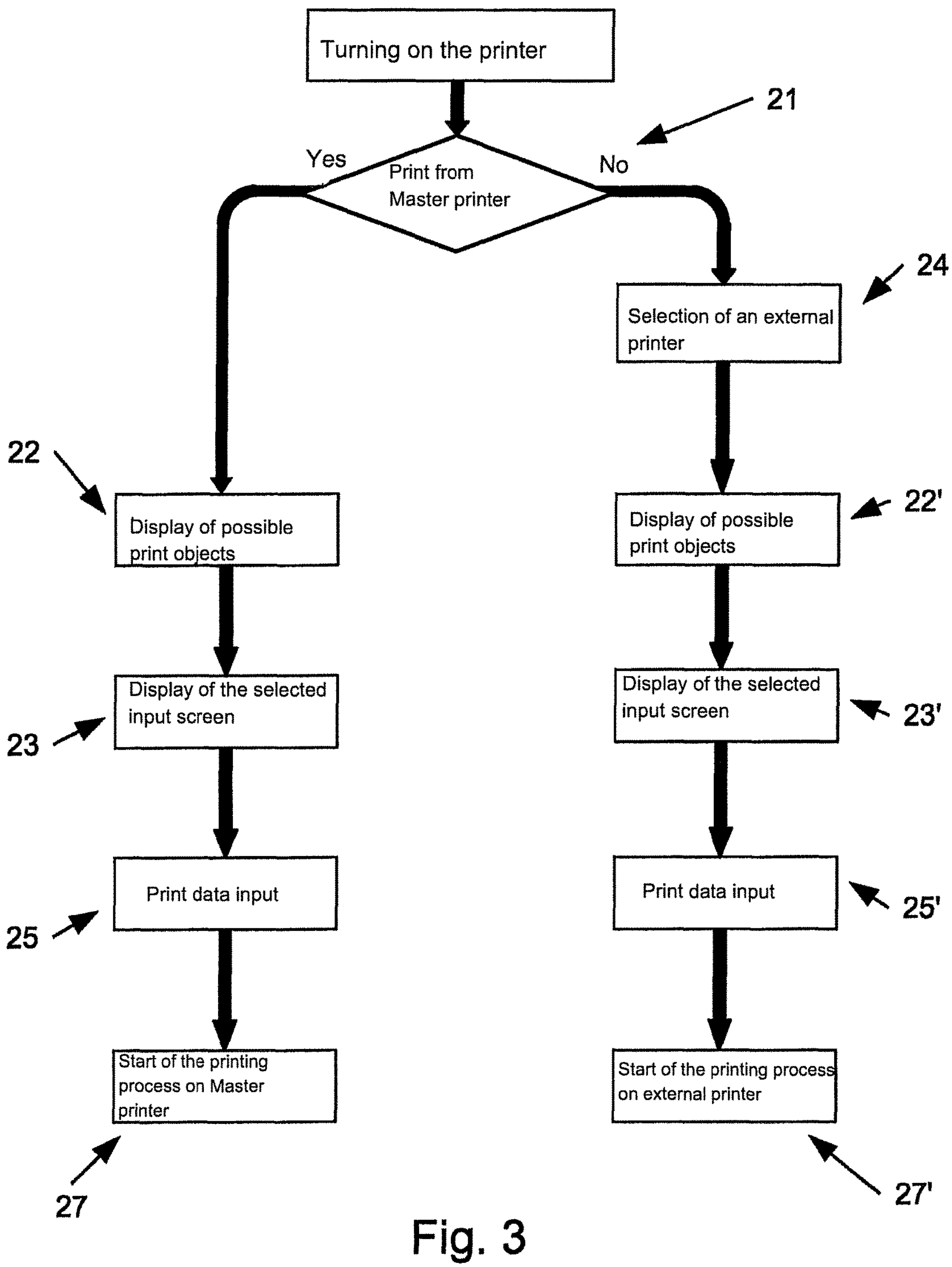
FIG. 3 shows a simplified flow chart of the method in accordance with the invention.
Figure 4:
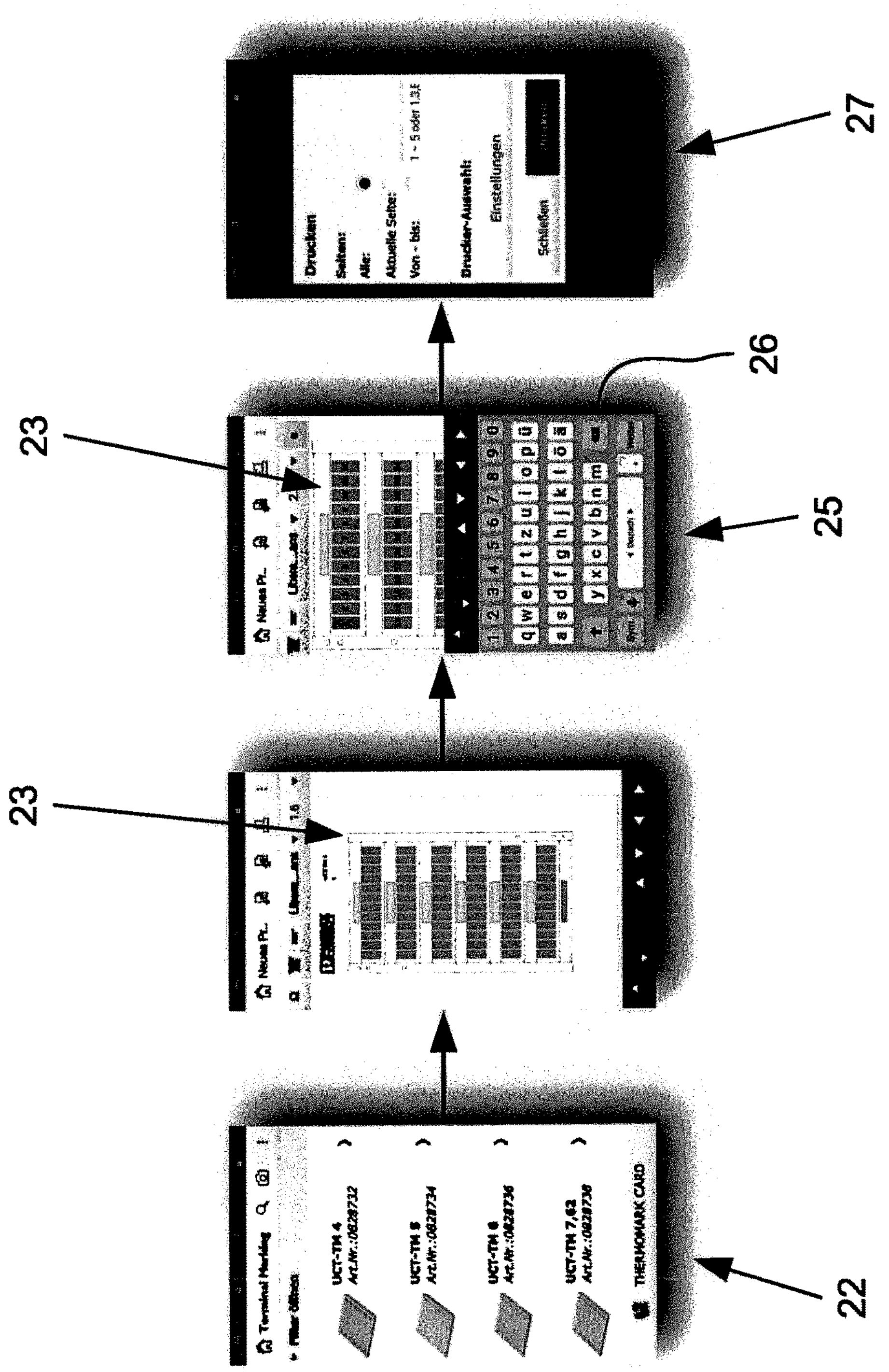
FIG. 4 shows an exemplary embodiment the selection windows displayed in succession for the first printer.
Figure 5:
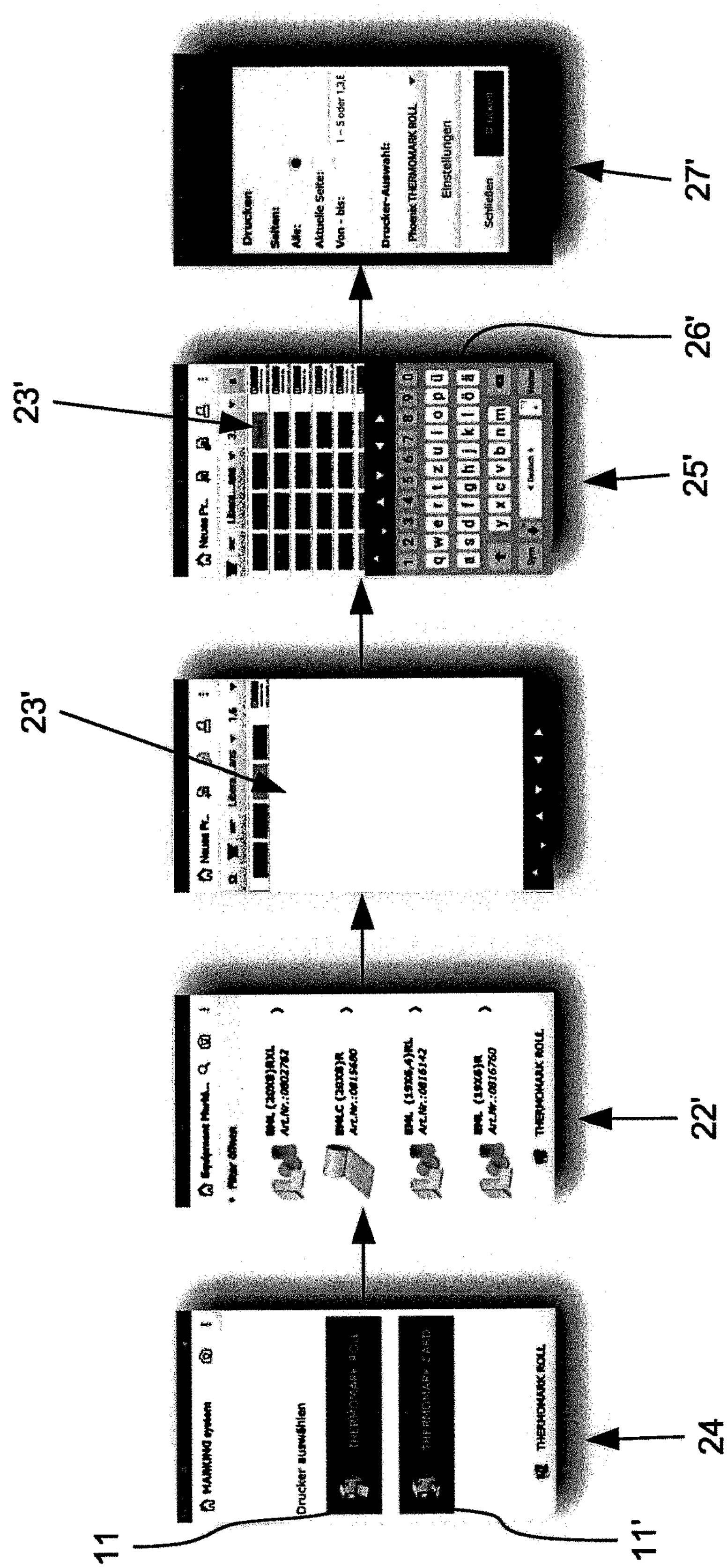
FIG. 5 shows an exemplary embodiment the selection windows displayed in succession for the second printer.

To input print data for printing upon a print object 6, 16, different selection windows are displayed on the input and display apparatus 10 of the printer 1 according to the simplified flowchart of the method in accordance with the invention shown in FIG. 3. FIG. 4 shows different exemplary embodiments of the selection windows which are displayed on the input and display unit 10 when a print object 6 is to be printed upon using the first printer 1. Accordingly, FIG. 5 shows different exemplary embodiments of the selection windows which are being displayed on the input and display unit 10 of the first printer 1 if a print object 16 is to be printed upon using the second printer 11.

In the method in accordance with the invention, according to FIG. 3, after turning on the printer, first of all, a first printer selection screen 21 is displayed via which the user can select whether the print object is to be printed upon using the existing printer 1 or using a second external printer 11. The corresponding selection of the user is then evaluated in the control and evaluation unit 7 of the first printer 1 and then, depending on the result of the evaluation, a print object selection window 22, 22' is selected from the memory 9 and displayed on the input and display apparatus 10.

If the first printer 1 has been selected in the printer selection window 21, the input and display apparatus 10 displays a print object selection window 22 in which generally a plurality of print objects 6, corresponding symbols or their designations which can be printed upon by the selected printer 1 are shown. The user can then choose from these print objects 6 the print object 6 which is to be printed upon, the selection being evaluated in turn in the control and evaluation unit 7. In the exemplary embodiment according to FIG. 4, in the print object selection window 22 in addition to an image of the respective print object 6, in addition its designation and its article number are shown in order to make the selection more reliable for the user.

Afterwards, the input and display apparatus 10 displays an input screen 23 for the selected print object 6, the input screen 23 being selected by the control and evaluation unit 7 using the evaluated choice of the print object 6 from a plurality of input screens stored in the memory 9. The user can then input the individual print data for the print object 6 which is to be printed upon into the input screen 23, the input screen 23 being configured such that it is displayed directly to the user how the print object 6 printed upon later appears.

If the user has decided in the display of the printer selection window 21 in favor of a print object 16 being printed upon with the second external printer 11, the control and evaluation unit 7 selects a print object selection window 22' and displays it on the input and display apparatus 10 in which generally a plurality of print objects 16 which are to be printed upon with the second printer 11 are shown. In the print object selection window 22' which is shown in FIG. 5, in addition to an image of the respective print object 16, its designation and its article number are shown in addition. After selecting the print object 16 which is to be printed upon then an input screen 23' which fits the print object 16 is selected and displayed on the input and display apparatus 10 of the printer 1. The user can then input into this input screen 23' the print data for the print object 16 which is to printed upon using the second printer 11.

If a print object 6 is to be printed upon by the first printer 1, the print data are transmitted after input into the input screen 23 from the control and evaluation unit 7 to the printing device 4 of the printer 1. Conversely, the print data which have been input into the input screen 23' are transmitted from the control and evaluation unit 7 via the data communications interface 8 to the second printer 11 or its data communications interface 18 when a print object 16 is to be printed upon by the second printer 11. Last then, the printing process is started on the corresponding printer 1, 11, for which a corresponding input takes place on the input and display apparatus 7 of the first printer 1.

In the above described sequence of the input of print data which is shown in FIG. 3, on the input and display apparatus 10 of the first printer 1, after the display of the printer selection window 21, a further printer selection window 24 can be displayed when the evaluation on the input on the printer selection window 21 has resulted in that the printing is not to take place with the first printer 1, but with an external printer 11. In the printer selection window 24 then several external printers 11, 11' can be displayed for selection.

It is apparent from the representation of the respective input windows 25, 25' in FIGS. 4 and 5 that the input windows 25, 25' are divided in two as the print data are being input, specifically in addition to one segment of the input screen 23, 23' a keyboard panel 26, 26' is also displayed with which the individual print data are input into the individual identification labels of the print object 6, 16. In this way, with each input in the keyboard panel 26, 26' it can be directly checked how the input is acting on the print object 6, 16 after printing, i.e. whether in fact the selected input is appearing on the desired identification label of the print object 6, 16. Last, a print start window 27, 27' appears on the input and display apparatus 10 via which the start of printing upon the print object 6, 16 which was selected beforehand can be initiated on the first printer 1 or a second printer 11.

Figure 6:
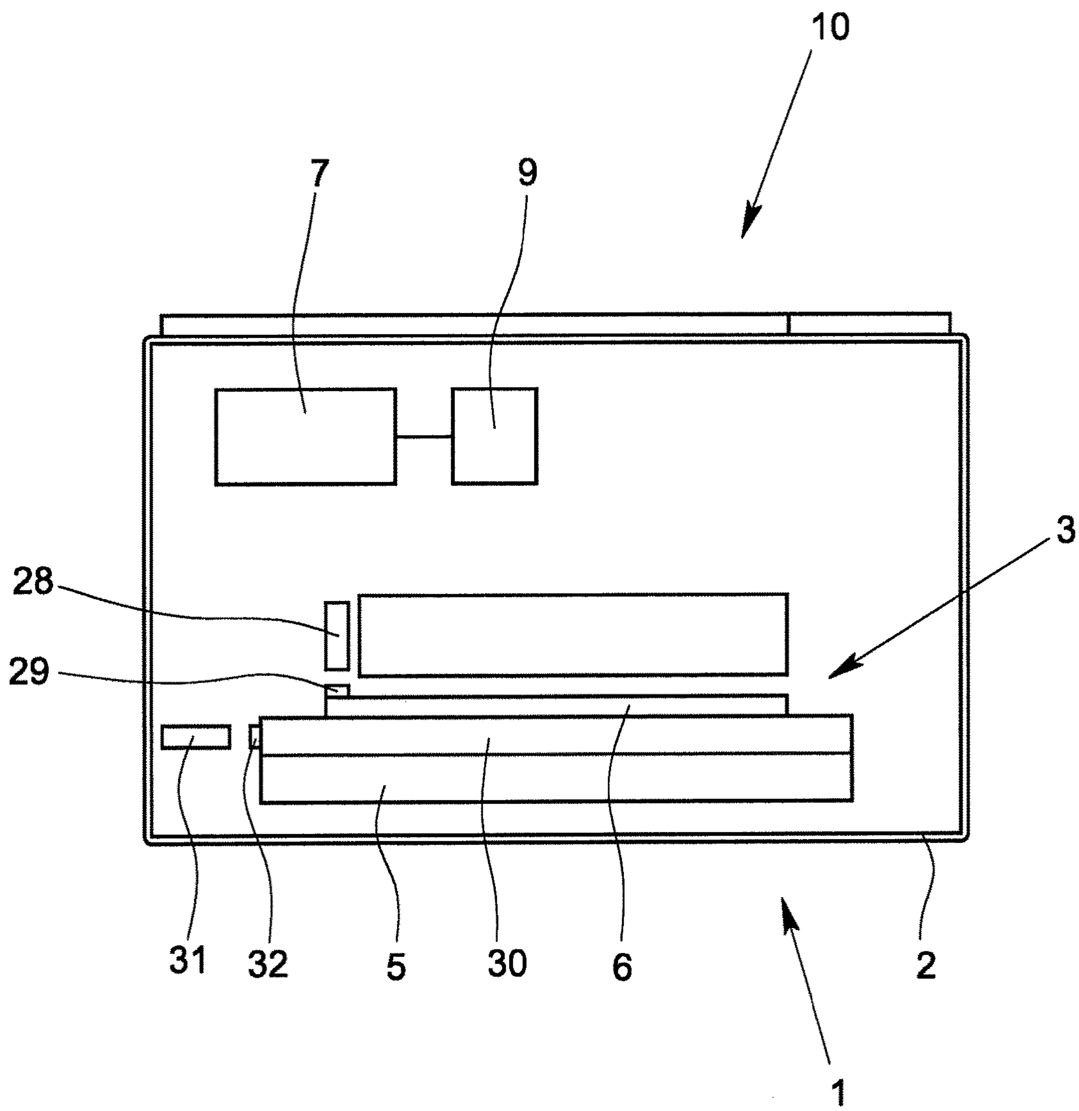
FIG. 6 shows a schematic cross-sectional view of the first printer of a printer system.

It is apparent from the schematic of the first printer 1 according to FIG. 6 that in the printer 1 there is an optical sensor 28 which is used to detect an identification 29 which is attached to the print object 6. Moreover, FIG. 6 also shows that the print object 6 is not inserted directly into the receiving device 5, but into a magazine 30 which can be inserted into the receiving device 5. Using a corresponding magazine 30 which is adapted to the respective print object 6 ensures that the print object 6 is always in a given position within the print space 3 even if the print objects 6 have different dimensions, in particular different thicknesses.

In addition to the sensor 28, there is another sensor 31 in the printer which can detect an identification 32 attached to the magazine 30. The two optical sensors 28, 31 are located within the housing 2 such that their optical axes run perpendicular to one another and perpendicular to the direction A in which the receiving device 5 moves. Since in addition the longitudinal extension both of the identification 29 of the print object 6 and also of the identification 32 of the magazine 30 extends parallel to the direction A in which the receiving device 5 moves, the identifications 29, 32 which are located on the print object 6 and on the magazine 30 are routed past the respective sensors 28, 31 when the receiving device 5 is moving out of the loading and unloading position into the print position within the print space 3.

In the method in accordance with the invention and in the printer system in accordance with the invention, since the selection of the print object 6, 16 to be printed upon and the input of the corresponding print data take place via the input and display apparatus 10 of the first printer 1 which after completed input of the print data transmits them to the second printer 11, it is sufficient if the second printer 11 has only a small input and display apparatus 33. For example, the status of the printer 11 or the print object 16 which has just been printed upon can be displayed to the user on this input and display apparatus 33.

But fundamentally, it is also possible for there not to be an input and display apparatus on the second printer 11, since the print parameters and print data can be input in the printer system completely via the first printer 1 which thus assumes the function of a "master" printer, while the second external printer 11 acts conversely as a "slave" printer. In the second printer 11 the control and evaluation apparatus 17 is used primarily for processing of the print parameters and print data which have been received via the interface 18 from the first printer 1. Accordingly, the memory 19 of the second printer 11 is also used primarily for buffering of print parameters and print data which have been transmitted to the second printer 11 from the first printer 1. Moreover, print data for printing upon individual print objects 16 which are being used by the control and evaluation apparatus 17 to control the printing device 14 can however also be stored in the memory 19.

The invention claimed is:

1. A method for printing upon a print object with a first printer or a second, external printer, the first printer having a housing with a print space in the housing, a printing device, a receiving device for the print object to be printed upon, a control and evaluation unit, a data communications interface, a memory and an input and display apparatus, comprising the following steps:

displaying a printer selection window on the input and display apparatus, selecting one of the first and second printing devices, displaying a completed selection of one of the first or second printer with which a print object is to be printed, selecting a print object selection window from at least two print object selection windows stored in the memory by the control and evaluation unit using the evaluated choice of based on the printer selected, displaying the selected print object selection window on the input and display apparatus, the print object selection window displaying at least one print object or a designation of the print object which can be printed upon by the selected printer and evaluating a completed selection of the print object in the control and evaluation unit, selecting an input screen from a plurality of input screens stored in the memory by the control and evaluation unit using the evaluated choice of the print object, displaying the selected input screen on the input and display apparatus, based upon the printer selected, transmitting of print data which have been input into the input screen to the printing device of the first printer or via the data communications interface of the first printer to the second, external printer, and printing upon the print object with the selected printer using the print data transmitted.

2. The method as claimed in claim 1, wherein, after displaying the printer selection window, another printer selection window is displayed when the evaluation of the completed selection of the printer has resulted in that the print object is to be printed upon with the second, external printer.

3. The method as claimed in claim 1, wherein the input print data are transmitted to a selected external printer directly via a cable or wirelessly.

4. The method as claimed in claim 1, wherein, after transmission of the print data, the printing process is started by means of an input in a print start window which is displayed on the input and display apparatus, regardless of whether the print object is being printed upon by the printer which has the input and display apparatus or the second, external printer.

5. The method as claimed in claim 1, wherein, there is at least one optical sensor for detection of an identification located on the print object in the housing, the method comprising the following additional steps:

retracting the receiving device out of the print space into a loading and unloading position outside of the print space for insertion of a print object into the receiving device when the completed evaluation of the print object to be printed upon with the printer is displayed on the input and display apparatus, moving the receiving device with the print object back into the print space, and detecting the identification located on the print object by the at least one optical sensor, and selecting an input screen from a plurality of input screens stored in the memory by the control and evaluation unit using the identification of the inserted print object detected by the at least one optical sensor.

6. A printer system, comprising:

a first printer having a housing with a print space, at least one second printer having a second housing with a second print space wherein each of the first and second printers has a receiving device for a print object to be printed upon, wherein the first printer has a control and evaluation unit, and a data communications interface, wherein at least the first printer has a memory and an input and display unit with a printer selection window for selection of the first or second printer for printing on a selected print object and a print object selection window for selecting a print object, wherein the control and evaluation unit of the first printer has means for evaluating a printer selection made in the printer selection window and a selection of a print object made in the print object selection window, and wherein the print object selection window is selectable based upon a previous printer selection for selecting an input screen for the selected print object from a plurality of input screens stored in the memory, and wherein the control and evaluation unit of the first printer has means for transmitting print data input in an input screen displayed on the input and display unit of the first printer via the data communications interface to the second printer when the second printer has been selected for printing of the print object.

7. The printer system as claimed in claim 6, wherein the input and display unit of the first printer is rotatably and pivotably attached to the housing of the printer and is a touch-screen.

8. The printer system as claimed in claim 7, wherein the first printer prints upon print objects in card format and the receiving device accommodates an interchangeable magazine into which the print object which is to be printed upon is insertable, the receiving device being movable between a loading and unloading position outside the print space and a print position within the print space.

9. The printer system as claimed in claim 8, wherein the second printer prints upon print objects in roll format.

10. The printer system as claimed in claim 6, wherein at least one optical sensor is located in the housing of the first printer for detection of an identification which is located on the print object, and wherein the control and evaluation unit of the first printer has means for selecting the input screen which is suitable for the inserted print object from a plurality of input screens stored in the memory using the identification of the inserted print object detected by the sensor, and for displaying the selected input screen on the input and display apparatus.

11. The printer system as claimed in claim 6, wherein the first printer and the second printer print upon different types of print objects from each other.

* * * * *